Patented Mar. 16, 1954

2,672,481

UNITED STATES PATENT OFFICE 2,672,481

POLYENE INTERMEDIATES AND METHODS OF MAKING SAME

Leonard Weisler and John M. Dieterle, Rochester, N. Y., assignors to Eastman Kodak Company, Rochester, N. Y., a corporation of New Jersey No Drawing. Application November 25, 1950, Serial No. 197,642

7 Claims. (Cl. 260—586)

This invention relates to chemical intermediates useful in the synthesis of polyenes and to methods of making such intermediates.

The synthesis of polyenes such as vitamin A and similar carotenoid polyenes is complicated by the tendency of the materials to isomerize under reaction conditions to give a mixture of the desired $\alpha,\beta$-unsaturated compound and an undesirable $\beta,\gamma$-unsaturated isomer of the desired compound. The objectionable isomerization of polyenes during synthesis, and particularly during dehydration of a hydroxy compound, is largely oviated by the use of an intermediate having an acetylenic linkage in the carbon chain to limit the dehydration to a desired position.

It is accordingly an object of this invention to provide a new and useful method of making a compound which is capable of entering into polyene syntheses without objectionable isomerization.

It is also an object of this invention to provide an improved method of making intermediates useful in the synthesis of vitamin A.

A further object of this invention is to provide an improved method of making a derivative of trimethyl cyclohexanone having a side chain containing an acetylenic linkage.

Another object of the invention is to provide an improved method of making 1-(2,6,6-trimethyl cyclohexen-1-yl) but-1-yne-3-one.

Another object of the invention is to provide new compounds which are convertible to 1-(2,6,6-trimethyl cyclohexen-1-yl) but-1-yne-3-one.

Another object of the invention is to facilitate the synthesis of vitamin A by providing new methods of synthesizing improved vitamin A intermediates.

Other objects will be apparent from the description and claims which follow.

These and other objects are attained by means of this invention which comprises converting trimethyl cyclohexanone to 1-(2,6,6-trimethyl cyclohexen-1-yl) but-1-yne-3-one by condensing 2,6,6-trimethyl cyclohexanone with but-1-yne-3-ol to form the condensation product, 1-(1-hydroxy-2,6,6-trimethyl cyclohexane) but-1-yne-3-ol, oxidizing this condensation product to the oxidation product, 1-(1-hydroxy-2,6,6-trimethyl cyclohexane) but-1-yne-3-one, and dehydrating this oxidation product to 1-(2,6,6-trimethyl cyclohexen-1-yl) but-1-yne-3-one.

The condensation of the 2,6,6-trimethyl cyclohexanone with the but-1-yne-3-ol is carried out in the presence of a suitable condensation catalyst such as lithium amide, sodamide, potassium amide, calcium amide, a Grignard reagent, or a catalyst complex of potassium hydroxide and a solvent having two ether-oxygen atoms separated by one or two carbon atoms, such as acetals, ketals or dialkyl ethers of ethylene glycols, as for example acetaldehyde dipropyl acetal, as prepared by the method of Weizmann set out in U. S. Patent 2,472,135. The condensation is desirably effected in liquid ammonia at lowered temperatures for ready control of the reaction.

The product of the condensing, 1-(1-hydroxy-2,6,6-trimethyl cyclohexane) but-1-yne-3-ol, is then oxidized to the corresponding ketone, 1-(1-hydroxy-2,6,6-trimethyl cyclohexane) but-1-yne-3-one by one of the oxidation procedures suitable for converting carbinols to carbonyls as for example by subjecting the condensation product to the Oppenauer procedure employing a magnesium alkoxide or an aluminum alkoxide as oxidizing agent or by treating the condensation product with an oxidizing inorganic oxide. Thus suitable oxidizing agents include aluminum isopropoxide, aluminum t-butoxide, manganese dioxide, magnesium isopropoxide, chromic oxide, magnesium ethoxide and similar well-known oxidizing agents. The oxidation proceeds readily at room temperature in some cases, although elevated temperatures can be employed if desired for accelerating the course of the oxidation. The oxidation is desirably effected in solvent medium, with inert hydrocarbon solvents such as benzene, hexane, or the like being desirably employed. In such case, the oxidation is desirably effected by refluxing the reaction mixture.

The hydroxy ketone formed as oxidation product is then dehydrated to remove the hydroxyl group substituent on the ring and thereby convert the hydroxy ketone to the desired 1-(2,6,6-trimethyl cyclohexen-1-yl) but-1-yne-3-one. Dehydration is effected by treating the hydroxy ketone with an acidic dehydrating agent. Thus dehydration is effected by distilling the hydroxy ketone from fused sodium acid sulfate, by treating it with thionyl chloride in pyridine at low temperature such as −20° C., by treating it with a mixture of acetic acid and acetic anhydride catalyzed with ethyl hydrogen sulfate, by treating it with sulfuric acid, or by treating it with other acidic materials in accordance with known dehydration practices.

The resulting 1-(2,6,6-trimethyl cyclohexen-1-yl) but-1-yne-3-one obtained by means of the process embodying this invention can thereafter be used in the synthesis of polyenes of the carotenoid series.

The invention is illustrated by reference to

Example 1

The condensation of 2,6,6-trimethyl cyclohexanone with but-1-yne-3-ol is effected in excellent yield in accordance with the following procedure. A 22 g. portion of lithium amide was added to 500 ml. of liquid ammonia. This mixture was maintained at −70° C. and stirred while 26 g. of but-1-yne-3-one was added over a period of 30 minutes. The mixture was allowed to stand for an additional 30 minutes, after which time, a dropwise addition of 45 g. of 2,6,6-trimethyl cyclohexanone was effected at the rate of 1 g. per minute, followed by the addition of 50 ml. of dry ether. The temperature of the reaction mixture was permitted to rise to −40° C. and then the mixture was maintained at that temperature for 5 hours. The ammonia was allowed to evaporate from the reaction mixture and gradually replaced with 400 ml. of dry ether. The reaction mixture was allowed to stand overnight at room temperature. The mixture was then cooled to 5° C. and 250 ml. of saturated ammonium chloride added thereto. The ether layer was separated from the aqueous layer, and the aqueous layer extracted with ether. The combined ether solutions were then washed with dilute hydrochloric acid and saturated sodium chloride solution, dried, and the ether removed by distillation. Unreacted trimethyl cyclohexanone and but-1-yne-3-ol were distilled away leaving 36 g. of 1-(1-hydroxy-2,6,6-trimethyl cyclohexane) but-1-yne-3-ol as a viscous orange oil. Similar results, although in somewhat lowered yields, are obtained with other well-known condensation catalysts such as sodamide, Weizmann catalyst, calcium amide and potassium amide, or by the Grignard procedure.

Example 2

The oxidation of 1-(1-hydroxy-2,6,6-trimethyl cyclohexane) but-1-yne-3-ol to the corresponding hydroxy ketone, 1-(1-hydroxy-2,6,6-trimethyl cyclohexane) but-1-yne-3-one, proceeds readily by means of the Oppenauer oxidation procedure with metal alkoxides such as aluminum or magnesium alkoxides as well as with oxidizing inorganic oxides. Thus, for example, the oxidation with manganese dioxide was carried out as follows. Thirty-six grams of 1-(1-hydroxy-2,6,6-trimethyl cyclohexane) but-1-yne-3-ol were dissolved in 300 ml. of hexane and a 200 g. portion of precipitated manganese dioxide was added. The mixture was stirred and refluxed for 90 minutes and then filtered. The product weighed 34.5 g. and had $$E_{1\,cm.}^{1\%}\,(225\,m\mu)=286$$

Upon vacuum distillation, 24.7 g. of 1-(1-hydroxy-2,6,6-trimethyl cyclohexane) but-1-yne-3-one was obtained having a boiling point at 7 mm. Hg pressure of 146–147° C. and having $$E_{1\,cm.}^{1\%}\,(225\,m\mu)=323$$

Example 3

The hydroxy ketone, 1-(1-hydroxy-2,6,6-trimethyl cyclohexane) but-1-yne-3-one is dehydrated to the desired 1-(2,6,6-trimethyl cyclohexen-1-yl) but-1-yne-3-one by treatment with an acid dehydrating agent. In a typical case, a 2.0 g. portion of the hydroxy ketone was distilled under reduced pressure from fused sodium bisulfate. The product concentrate of 1-(2,6,6-trimethyl cyclohexen-1-yl) but-1-yne-3-one boiled at 137° C. under 13 mm. pressure and had $$E_{1\,cm.}^{1\%}\,(284\,m\mu)=262$$

It gave a 2,4-dinitrophenyl hydrazone derivative which melted at 137–139° C. uncorrected and had $$E_{1\,cm.}^{1\%}\,(372\,m\mu)=690$$

Other typical dehydration procedures include treating the hydroxy ketone with thionyl chloride and pyridine at −20° C., or treating it with a mixture of acetic acid and acetic anhydride containing a small amount of ethyl hydrogen sulfate. If desired, the ketonic group can be protected during dehydration by ketalization in accordance with known practices whereupon the product is hydrolyzed following dehydration to reconstitute the ketone. Ketalization is effective also in case it is desired to convert the but-1-yne-3-ol to the corresponding ketone before condensation.

This invention thus provides a new and improved method of making chemical intermediates which are useful in polyene syntheses and particularly in making 1-(2,6,6-trimethyl cyclohexen-1-yl) but-1-yne-3-one which is capable of entering into vitamin A syntheses without objectionable isomerization.

While the invention has been described in considerable detail with reference to certain preferred embodiments, it will be understood that variations and modifications can be effected without departing from the spirit and scope of the invention as described hereinabove and as defined in the appended claims.

We claim:

1. The method of making a compound capable of entering into polyene syntheses without isomerization which comprises condensing 2,6,6-trimethyl cyclohexanone with but-1-yne-3-ol in the presence of a condensation catalyst and thereby forming 1-(1-hydroxy-2,6,6-trimethyl cyclohexane)-but-1-yne-3-ol as condensation product, oxidizing said condensation product with a metal-containing oxidizing agent and thereby forming the oxidation product 1-(1-hydroxy-2,6,6-trimethyl cyclohexane)-but-1-yne-3-one, and dehydrating said oxidation product with an acidic dehydrating agent and thereby converting said oxidation product to 1-(2,6,6-trimethyl cyclohexen-1-yl)-but-1-yne-3-one.

2. The method of making a compound capable of entering into polyene syntheses without isomerization which comprises condensing 2,6,6-trimethyl cyclohexanone with but-1-yne-3-ol in the presence of a condensation catalyst and thereby forming 1-(1-hydroxy-2,6,6-trimethyl cyclohexane) but-1-yne-3-ol as condensation product, oxidizing said condensation product with an oxidizing agent selected from the class consisting of magnesium alkoxides, aluminum alkoxides, manganese dioxide and chromic oxide and thereby forming 1-(1-hydroxy-2,6,6-trimethyl cyclohexane) but-1-yne-3-one as oxidation product, and dehydrating said oxidation product with an acidic dehydrating agent and thereby converting said oxidation product to 1-(2,6,6-trimethyl cyclohexen-1-yl) but-1-yne-3-one.

3. The method of making a compound capable of entering into polyene syntheses without isomerization which comprises condensing 2,6,6-trimethyl cyclohexanone with but-1-yne-3-ol in liquid ammonia and in the presence of lithium amide and thereby forming 1-(1-hydroxy-2,6,6-trimethyl-cyclohexane) but-1-yne-3-ol as condensation product, oxidizing said condensation product with a metal-containing oxidizing agent and thereby forming 1-(1-hydroxy-2,6,6-trimethyl-cyclohexane) but-1-yne-3-one as oxidation product, and dehydrating said oxidation product to 1-(2,6,6-trimethyl cyclohexen-1-yl) but-1-yne-3-one with an acidic dehydrating agent.

4. The method of making a compound capable of entering into polyene syntheses without isomerization which comprises condensing 2,6,6-trimethyl cyclohexanone with but-1-yne-3-ol in the presence of a metal amide condensation catalyst and thereby forming 1-(1-hydroxy-2,6,6-trimethyl cyclohexane) but-1-yne-3-ol as condensation product, oxidizing said condensation product with an oxidizing agent selected from the class consisting of magnesium alkoxides, aluminum alkoxides, manganese dioxide and chromic oxide and thereby forming 1-(1-hydroxy - 2,6,6 - trimethyl - cyclohexane) but-1-yne-3-one as oxidation product, and treating said oxidation product with an acidic dehydrating agent and thereby dehydrating said oxidation product to 1-(2,6,6-trimethyl cyclohexene-1-yl) but-1-yne-3-one.

5. The method of making a compound capable of entering into polyene syntheses without isomerization which comprises condensing 2,6,6-trimethyl cyclohexanone with but-1-yne-3-ol in liquid ammonia and in the presence of lithium amide and thereby forming 1-(1-hydroxy-2,6,6-trimethyl cyclohexane) but-1-yne-3-ol as condensation product, oxidizing said condensation product with an oxidizing agent selected from the class consisting of magnesium alkoxides, aluminum alkoxides, manganese dioxide and chromic oxide and thereby forming 1-(1-hydroxy-2,6,6-trimethyl cyclohexane) but-1-yne-3-one as oxidation product, and thereafter treating said oxidation product with an acidic dehydrating agent and thereby dehydrating said oxidation product to 1-(2,6,6-trimethyl cyclohexen-1-yl) but-1-yne-3-one.

6. As a new chemical compound, 1-(1-hydroxy-2,6,6-trimethyl cyclohexane) but-1-yne-3-ol.

7. As a new chemical compound, 1-(1-hydroxy-2,6,6-trimethyl cyclohexane) but-1-yne-3-one.

LEONARD WEISLER.
JOHN M. DIETERLE.

References Cited in the file of this patent

UNITED STATES PATENTS

| Number | Name | Date |
|---|---|---|
| 2,531,567 | Heilbron et al. | Nov. 28, 1950 |

FOREIGN PATENTS

| Number | Country | Date |
|---|---|---|
| 627,453 | Great Britain | Aug. 9, 1949 |

OTHER REFERENCES

Ball et al.: Biochemical Journal, vol. 42, pages 516–523 (1948).

Milas et al.: J. Am. Chem. Soc., vol. 70, pages 1597–1607 (1948).

Milas et al.: J. Am. Chem. Soc., vol. 70, pages 1829–1834 (1948).

Isler: Chimia, vol. 4, pages 103–118, May 1950.